United States Patent
Shipp

(10) Patent No.: US 7,519,997 B2
(45) Date of Patent: Apr. 14, 2009

(54) METHOD OF AND SYSTEM FOR HEURISTICALLY DETECTING VIRUSES IN EXECUTABLE CODE

(75) Inventor: Alexander Shipp, Gloucester (GB)

(73) Assignee: Messagelabs Limited, Gloucester (GB)

( * ) Notice: Subject to any disclaimer, the term of this patent is extended or adjusted under 35 U.S.C. 154(b) by 631 days.

(21) Appl. No.: 10/500,953

(22) PCT Filed: Dec. 8, 2003

(86) PCT No.: PCT/GB03/05328

§ 371 (c)(1),
(2), (4) Date: Sep. 3, 2004

(87) PCT Pub. No.: WO2004/053663

PCT Pub. Date: Jun. 24, 2004

(65) Prior Publication Data

US 2005/0022016 A1    Jan. 27, 2005

(30) Foreign Application Priority Data

Dec. 12, 2002    (GB) ................................. 0229032.8

(51) Int. Cl.
*G06F 12/14* (2006.01)

(52) U.S. Cl. .......................... 726/24; 713/187; 713/188

(58) Field of Classification Search .................. 726/24; 713/188, 187; 706/12
See application file for complete search history.

(56) References Cited

U.S. PATENT DOCUMENTS

| 5,440,723 | A | * | 8/1995 | Arnold et al. ................... 714/2 |
| 5,675,711 | A | * | 10/1997 | Kephart et al. ................. 706/12 |
| 6,016,546 | A | * | 1/2000 | Kephart et al. ................. 726/24 |
| 6,357,008 | B1 | * | 3/2002 | Nachenberg ................. 726/24 |
| 6,971,019 | B1 | * | 11/2005 | Nachenberg ................. 713/188 |
| 2002/0066024 | A1 | | 5/2002 | Schmall et al. |
| 2002/0157008 | A1 | | 10/2002 | Radatti |

OTHER PUBLICATIONS

Veldman; "Combating Viruses Heuristically"; Virus Bulletin Conference, Virus Bulletin Ltd., Abington, GB, Sep. 1993, pp. 67-75, XP000828110.

* cited by examiner

*Primary Examiner*—Andrew L Nalven
(74) *Attorney, Agent, or Firm*—Nixon & Vanderhye, PC

(57) ABSTRACT

A method of scanning a computer file for virus infection attempts to identify whether the file contains program code and if it does, it then attempts to identify the compiler used to generate the code and performs a frequency distribution analysis of instructions found in the code to see whether it corresponds with an expected distribution for a program created with that compiler; if it does not, then the file is flagged as possibly having a viral infection.

12 Claims, 2 Drawing Sheets

METHOD OF AND SYSTEM FOR HEURISTICALLY DETECTING VIRUSES IN EXECUTABLE CODE

This application is the US national phase of international application PCT/GB03/05328, filed 8 Dec. 2003, which designated the US and claims priority to GB Application No. 00229032.8, filed 12 Dec. 2002. The entire contents of these applications are incorporated herein by reference.

BACKGROUND AND SUMMARY

The present invention relates to a method of, and system for, heuristically detecting viruses in executable code by analysing the frequency distribution of machine code created.

A common form of computer virus infection is where the virus's executable code is attached to, or embedded in, a program or other computer file containing executable code which appears, on the face of it, to be benign. One well-established method of virus propagation is where the virus, once activated on a host machine such as a user's PC, will attach itself to one or more programs found on the host in such a way that that program, once run, will execute the virus's code giving it the opportunity to propagate again and/or to undertake whatever other malignant behaviours (such as destruction of files, etc.) have been programmed into it. This method of propagation does, of course, provide an opportunity to detect the virus, for example by associating checksums with program files and detecting when this checksum changes. That is of course only one of the many strategies which have been devised to detect viruses.

Another well-known method of detecting viruses, implemented in many of the anti-virus software packages which are available, involves scanning program and other files for certain characteristic sequences of bytes (known as signatures) which indicate the likely presence of a virus. One of the practical problems with signature-based detection is that it requires some skill and a significant amount of time, when a new virus is first detected, to establish a suitable characteristic signature of it. This signature needs to be one which does not produce too many false positives and which does not misidentify the virus, for example as an existing one with a more benign payload. This signature information then needs to be disseminated to sites which use the anti-virus package in question before it can be used there to detect the newly-identified virus. In recent years, many of the notable virus outbreaks have involved viruses which propagate over the internet and it takes time for publishers of anti-virus software to react when a virus outbreak occurs.

Some internet service providers offer anti-virus scanning of internet traffic passing through their internet nodes as a value-added service.

The present invention relates to a method of virus detection which is intended to be useful for ISPs performing anti-virus scanning, e.g. of executables such as program files attached to emails, though it is by no means limited to that application and may be used in any anti-virus package.

According to the present invention there is provided a method of scanning a computer file for virus infections comprising:

a) identifying program code within the file;
b) identifying the compiler used to create the program code;
c) determining the frequency distribution of selected machine code insructions or sequences of such instructions; and
d) flagging the file as possibly infected with a virus, or not, on the basis of comparison of the determined frequency distribution with a frequency distribution of machine code instructions or sequences thereof expected for that compiler.

The invention also provides a system for scanning a computer file for virus infections comprising:

a) means for identifying program code within the file;
b) means for identifying the compiler used to create the program code;
c) means for determining the frequency distribution of selected machine code instructions or sequences of such instructions; and
d) means for flagging the file as possibly infected with a virus, or not, on the basis of comparison of the determined frequency distribution with a frequency distribution of machine code instructions or sequences thereof expected for that compiler.

BRIEF DESCRIPTION OF THE DRAWINGS

The invention will be further described by way of non-limitative example with reference to the accompanying drawings, in which.

DETAILED DESCRIPTION OF EXAMPLE EMBODIMENTS

Figure 1:
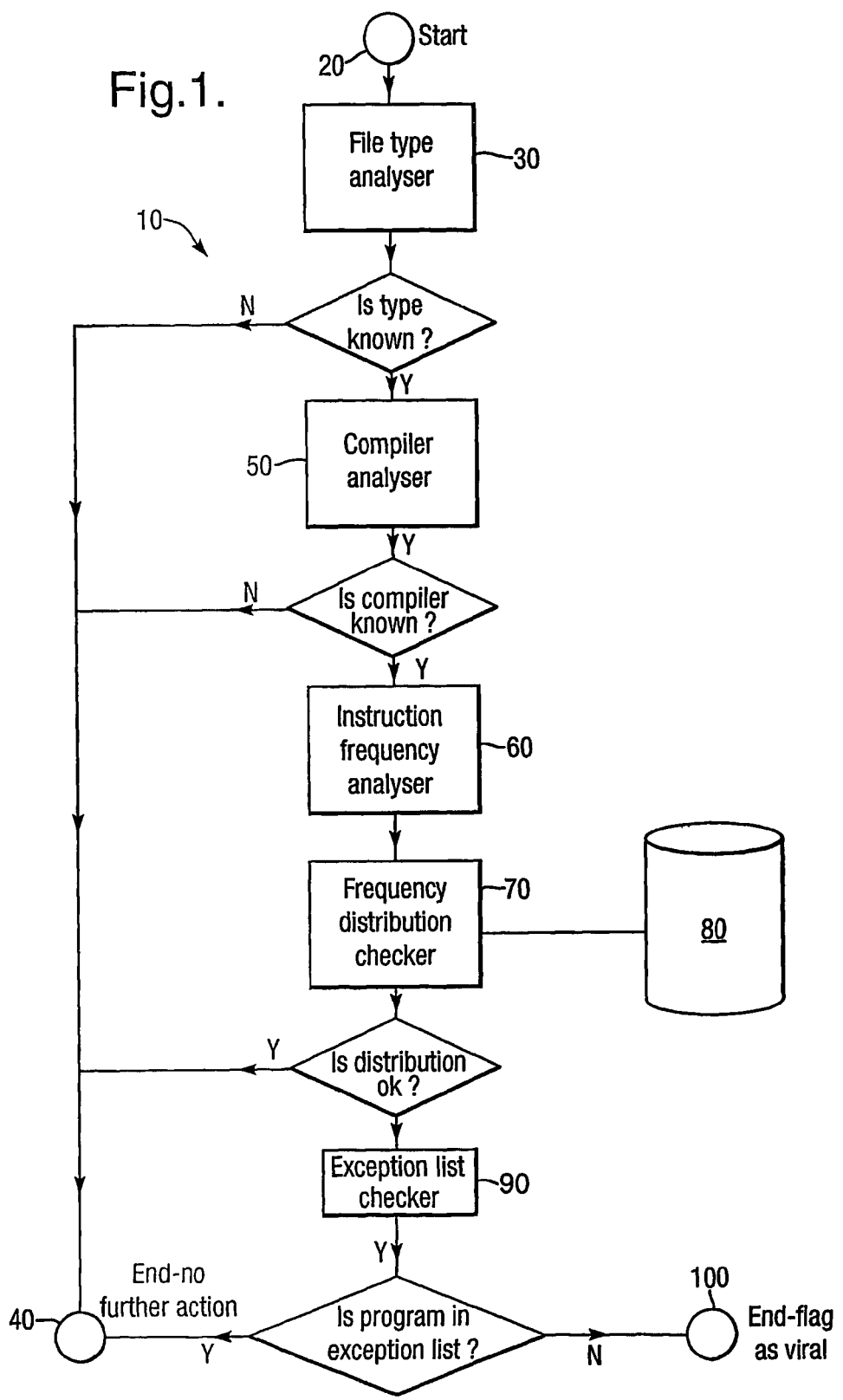
FIG. 1 is a combined block diagram of, and flow chart of the operation of, a virus scanning engine according to one embodiment of the present invention.

In the following hexadecimal values are represented with a leading 0x, like this: 0xff78. 0x???? is used to represent a hexadecimal value where the value is unimportant.

Some terminology will first be discussed.

"MD5 (message digest 5) checksum": MD5 is a one-way hashing algorithm—it generates a large number (the MD5 checksum) after analysing a byte stream—such as a file. The chances of two files generating the same large number are very small. It is also very difficult to create a file which will generate any particular MD5 checksum.

"False positive": A false positive occurs when an anti-virus product identifies a particular file 'a' as being malware, whereas in fact it is not.

"Regular expression": Regular expressions are strings which can be used for pattern matching. For instance, the perl regular expression /^hello [0-9]+/ matches any string starting with the letters 'hello', then a space, then one or more digits.

"Memory map": A memory map is a one to one mapping of the locations a program would occupy when loaded into memory, with some other locations. Thus, if a program would occupy locations 0x400000 to 0x410000 when loaded, we might construct a memory map from 0x100000 to 0x110000. Whenever the program refers to a particular location, we would (in this case) determine the equivalent location in our memory map by subtracting 0x300000. Thus 0x400000 maps to 0x100000, 0x400001 maps to 0x100001, and so on.

"Compiler": According to strict usage, a compiler generates one or more object modules from program source code. These object modules are typically not executable programs per se but require an additional step of linking by a linker. The action of a linker is typically to generate an image of an executable by linking together the object module(s), and external binary libraries which the module(s) reference; the production of the image may involve the pre-pending of a header region according to an executable file layout of a target operating system as well as the addition of resources such as bitmaps and the like. The term "compiler" as used herein is intended to include a linker, if required from a technical standpoint. What the compiler produces is not necessarily a stand-alone program, of course: compilers also produce executables such as dynamic link libraries and device drivers.

Compilers often have compiler flags (also known as "switches") which can be set by the user and which influence the compilation process and the code generated. For example, compiler flags can control whether generated code is optimised for speed, code size, or neither, whether stack frames are used for subroutine calls and so on. Different settings of these flags may influence the frequency distribution of instructions in the code generated, and embodiments of the invention can account for this by having expected frequency data for a variety of combinations of compiler flag settings per compiler.

The term "computer file" as used herein is intended to be understood in a general sense and in particular is not intended to be restricted to on-disk files.

To gain control, a virus must insert itself into the execution path of program ode. The virus code will have originally been created by one particular compiler or assembler, and in general will be inserting itself into a program created by a different compiler or assembler. Often, a particular compiler will generate code that can be recognised as coming from that compiler or family of compilers. If this is the case, it is may then be possible to determine that the inserted viral code has not been generated by the compiler that generated the rest of the program, by comparing the actual frequency distribution of instructions in the program, with the expected frequency distribution of instructions generated by the identified compiler. The program can be then flagged as either suspicious or infected by a virus.

FIG. 1 shows in block form, one form of virus detection system 10 embodying the present invention which may be incorporated into a virus scanning engine.

The overall operation of this system 10 is as follows:

Files which are to be scanned are applied in succession to an input 20 e.g. form an input queue; how files are placed in this queue and from what source(s) are not directly relevant to the present invention, but they might for example be attachments of emails being processed by a mail gateway at an ISP, or files in a directory being processed by a disk scanning operation.

Each file to be processed is passed to a file type analyser 30 which attempts to identify the type of the file from its contents. For instance, it may be non-program, or program. A non-program file is are not analysed further and processing is discontinued at 40. A file which is considered to be a program is further classified depending on its type—for instance, DOS, Windows PE, Windows NE, Linux ELF, Macintosh, etc. If the file type analyser 30 determines that the file type is known, the file is then processed by compiler analyser 50, which attempts to identify the compiler used to generate the code in the file; it fails in this, processing of the file is discontinued at 40, otherwise the file is next processed by an instruction frequency analyser 60.

The analyser 60 effectively reverse-engineers the program and prepares a tabulation of the frequency distribution of certain machine code opcodes and/or opcode constructs, as will be described in greater detail below. This tabulation is passed to a frequency distribution checker 70 where it is compared with one or more sets of characteristic frequency distributions for the identified compiler held in a database 80. Any given compiler/linker may be capable of generating more than one type of executable (GUI application, console application, device driver etc.) and the compilation/linking cycle may be affected by the setting of one or more compiler/linker flags (for example, flags to control the creation or not of stack frames for subroutine calls, to indicate whether the generated program is a debug version, etc.) which may yield different expected frequency distributions which can be stored in the database and individually selected for consideration by the frequency distribution checker 70.

If the frequency distribution checker 70 determines that the actual frequency distribution from analyser 60 sufficiently closely matches the expected one for the identified compiler, processing of the file is discontinued at 40; otherwise the file is considered as suspicious and potentially containing a virus. In order to reduce the number of false positives, suspicious files are considered by exception list checker against a list of exceptions, i.e. files which although suspicious according to frequency distribution checker 70, may nevertheless be considered to be benign. The exception list checker may operate by reference to an exception list held in database 80 along with characteristics used to determine whether the file under consideration matches an exception. If the file does not match an exception, it is flagged as viral at output 100. The setting of this flag can be used to alert an operator, and/or initiate further processing of the file and/or to initiate appropriate remedial action (for example quarantining the file).

Recognising an Executable

The following is a simplistic example of an algorithm for determining if a file is likely to be an executable which could be used by the file type analyser 30. By analysing the first few bytes of a file it is possible to tell whether it is likely to be an executable. For instance, to recognise a Windows PE file:

Read in first 2 bytes. If these are not 'MZ' then stop.
Read in another 58 bytes
Read in 4 bytes into variable x (treating using intel byte-ordering)
Seek to offset x in file
Read in 4 bytes
If bytes are P E \0 \0, then file is likely to be a Windows PE file.

This algorithm can be enhanced to add recognition for as many other types of executable file as desired. For instance, if the first 4 bytes of a file are 0x7F 0x45 0x46, then the file is likely to be a linux executable using the ELF format.

Recognising the Compiler

There are various ways in which the compiler analyser 50 can recognise which compiler created a particular program. For instance, it could examine the startup sequence of the program, or the subroutine call and return sequences. In some cases, this is enough to identify the exact compiler version used. In others, this will identify a possible family of compilers.

Reverse Engineering the Program

Figure 2:
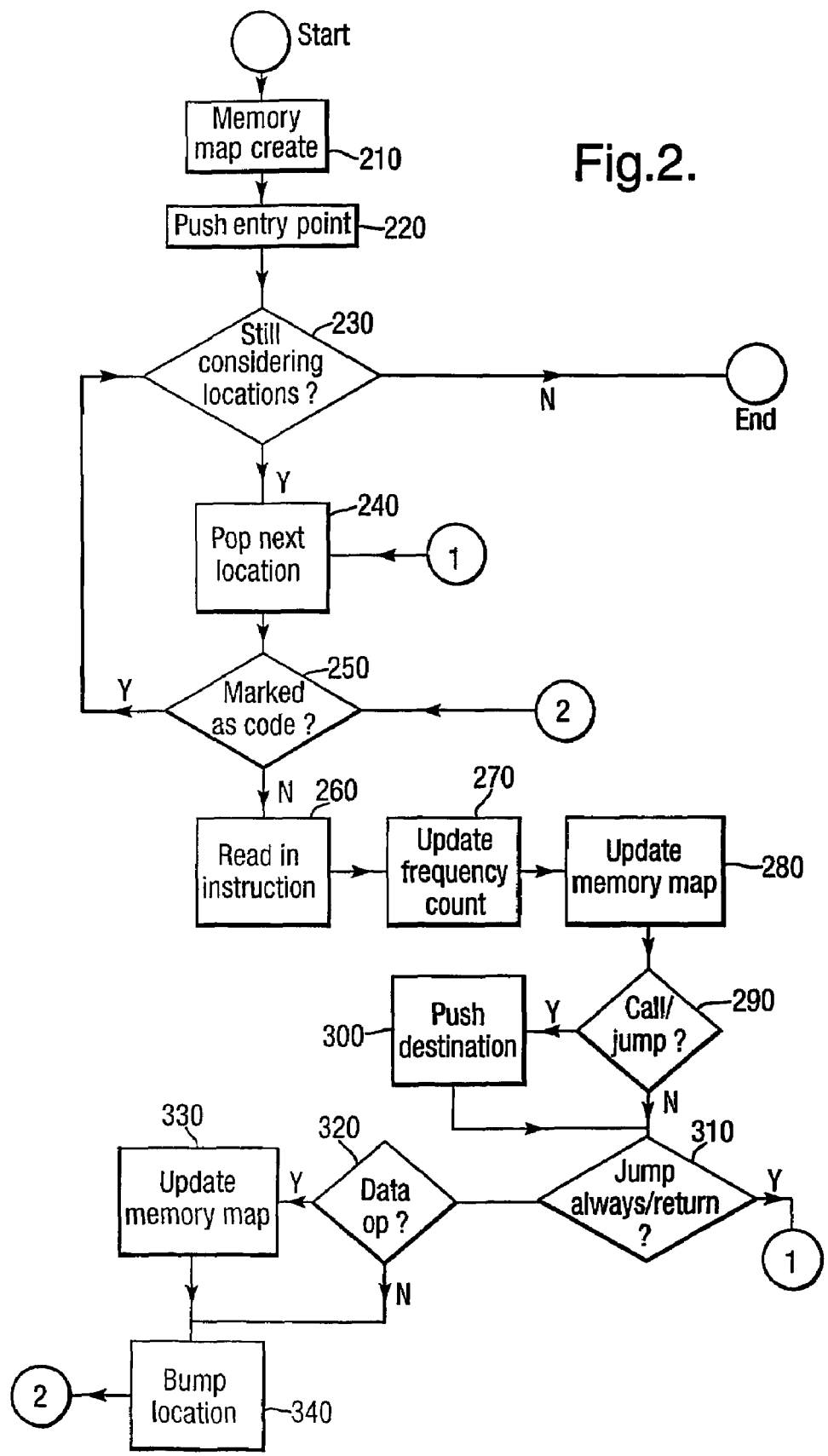
FIG. 2 is a flow chart of the operation of an example of the instruction frequency analyser of FIG. 1.

Following is a simplistic method by which this may be carried out by the instruction frequency analyser 60. This method is illustrated in FIG. 2 and is as follows:

Create a memory map of the locations used by the program, flagging each byte as 'not used' (step 210).
Push the program entry point onto a stack of locations to consider (220).
While there are still locations to consider (230)
Get next location as 'current location' (240)

LblNext:
  If memory map marks this byte as 'code' (250), stop processing this location
  Read in the instruction at this location, calculating its length in bytes (260)
  Update the frequency count for this instruction (270)
  Mark 'length' bytes in the memory map as 'code' (280)
  If instruction is a 'call', 'jump' or other instruction which could change the location of the next instruction (290), push the destination onto the stack of locations to consider (300)
  If the instruction is a 'jump always' or 'return' type instruction, stop processing this location (310)
  If the instruction loads or stores data at particular locations (320), mark the destination in the memory map as 'possible data' (330)
  Increment 'current location' by 'length' bytes (340)
  Carry on processing at lblnext
  Wend This algorithm can be enhanced in many ways to provide better results. For instance, once the processing is over, the memory map will have areas marked as 'code', 'possible data', and 'not used'. If there are too many areas marked as 'not used' then further analysis may be undertaken on these areas to try and determine if they are code or data. One such algorithm could be, check data to see if it contains characters in the range 0x20 to 0x7F, plus also 0x0A, 0x09 0x0d, ending with either 0x00 or '$'. If so, this could be a message displayed by the program being analysed and can be marked as data. The bytes immediately preceding the message can also be analysed to see if they appear to be a 1, 2 or 4 byte length of the message. Many other algorithms are possible. Certain types of program files, for example Windows dynamic link libraries, may contain multiple entry points and the above algorithms may be applied to each of them.

Known Frequency Checking

Particular compilers will do the same thing in the same way each time (when the same set of compiler flags is used). For instance, if compiler 'A' wants to add one to the EAX register, it may generate the following code:

```
add eax, 0x01
```

The eax register is 4 bytes long. However the compiler generates an instruction to add a one byte value, knowing that the processor will correctly pad out 0x01 to 0x0000001.

However, this is not the only way of adding one to the EAX register, so if we find any of the following code, in a program generated by compiler A, this would be suspicious:

```
inc     eax
add     eax, 0x0001         # two byte value used
add     eax, 0x00000001     # four byte value used
```

Many compilers generate particular entry and exit sequences for subroutines.

Suppose the compiler always generates the following:
Routine:

```
#here is the entry code
push    ebp
mov     ebp, esp
sub     esp, 0x????
...
```

```
#here is the exit code
mov     esp, ebp
pop     ebp
retn
```

Then if the program contains 100 'retn's, and if it only generates retns during the subroutine exit sequence, we would also expect to see at least 100 'push ebp's, 'mov ebp, esp's, 'sub esp 0x????', 'mov esp, ebp's and 'pop ebp's. Anything less than this would indicate that possible viral code has been introduced.

The compiler may also have a particular way of calling subroutines:

```
call    0x????
add     esp, 0x????
```

Thus if the program contains 100 'calls's, we would expect to see at least 100 'add esp, 0x????'s The compiler may never generate particular instructions. Thus, if the program contains one or more of these this would indicate that possible viral code has been introduced.

Eg int 3, which on x86 series Intel processors is a debugger breakpoint instruction Exception Rules Various exception rules can be added to the database 80 and applied by the exception list checker 90. As an example, int 3 instructions are common in viruses, but also may be present in debug versions of programs. Thus one rule could be that the presence of 'int 3's are ignored if it is determined that a program is a debug version.

Other instructions are used by system or kernel programs, but not by user programs. Thus, if they are present, they can be ignored if it is determined that a program is a system or kernel program.

Programs compiled with one compiler can be linked with code from libraries created by other compilers. These libraries can be detected by pattern matching and regular expressions, and excluded from the analysis. This step could also be performed before step 3 (reverse engineering) to mark areas as 'exclude for analysis'.

Particular executable files can be excluded by comparing an md5 checksum of the program with a list of exclusion md5s.

Enhancements

As well as using this as a stand-alone virus detection algorithm, this can be combined with other techniques as part of a larger system. For instance, programs flagged as suspicious by this method may be allocated a certain score, or variety of scores depending which tests pass and fail. Scores may also be assigned using other heuristic techniques, and only if the total score passes some limit is the program flagged as viral.

The system can also be used as an indicator or which parts of the program to analyse further. For instance, if unusual distributions have been found, the program can be reanalysed to find where these occur, and the limits of 'strange code' determined. This flagged code can then undergo a detailed analysis to try and determine what the code is actually doing. If it is deleting files or mass mailing, for instance, then that is a likely indication that the program is viral.

I claim:

1. A method of scanning a computer file comprising program code for virus infections, the method comprising:
   a) identifying, from a set of predetermined compilers, a compiler used to create the program code in the file;
   b) determining a frequency distribution of selected machine code instructions or sequences of such instructions in the program code in the file;
   c) maintaining a database holding frequency distributions of machine code instructions or sequences thereof expected for respective compilers in the set of predetermined compilers; and
   d) flagging the file as possibly infected with a virus, or not, on the basis of comparison of the determined frequency distribution with the frequency distribution of machine code instructions or sequences thereof stored in the database as being expected for the compiler identified in step a).

2. A method according to claim 1 wherein step b) comprises a step, working from an entry point of the program code, of
   b1) tracing an execution graph by decoding successive instruction opcodes and updating frequency counts of decoded instructions as this tracing proceeds.

3. A method according to claim 2 wherein when, during step b1), a subroutine call or conditional branch instruction is encountered, a destination of the call or branch instruction is pushed onto a stack, tracing proceeds into the subroutine call, and when a return instruction is encountered, the pushed location is popped from the stack and tracing continues with following instructions, if any.

4. A method according to claim 1 wherein the program code is examined for opcode constructs, which are expected to occur a known ratio to each other and, if the ratio actually found differs from the known one by more than a certain amount, the file is flagged as possibly viral, or subject to further processing.

5. A method according to claim 4, wherein the opcode constructs include subroutine-call and sub-routine return instruction sequences.

6. A method according to claim 1, further comprising a step, where step d) flags the file as possibly viral, of comparing the program code with a list of permissible exceptions and suppressing the flag if the program code is considered to be in the exception list.

7. A system implemented on a computer apparatus and operative to scan a computer file comprising program code for virus infections, the system comprising:
   a compiler analyser operative to identify, from a set of predetermined compilers, a compiler used to create the program code in the file;
   an instruction frequency analyser operative to determine a frequency distribution of selected machine code instructions or sequences of such instructions in the program code in the file;
   a database holding frequency distributions of machine code instructions or sequences thereof expected for respective compilers in the set of predetermined compilers; and
   a frequency distribution checker operative to flag the file as possibly infected with a virus, or not, on the basis of comparison of the determined frequency distribution with the frequency distribution of machine code instructions or sequences thereof stored in the database as being expected for the compiler identified by the compiler analyser.

8. A system according to claim 7, wherein the instruction frequency analyser is operative working from an entry point of the program code, to trace an execution graph by decoding successive instruction opcodes and updating frequency counts of decoded instructions as this tracing proceeds.

9. A system according to claim 8, wherein the instruction frequency analyser is operable such that when a subroutine call or conditional branch instruction is encountered, a destination of the call or branch instruction is pushed onto a stack, tracing proceeds into the subroutine call, and when a return instruction is encountered, the pushed location is popped from the stack and tracing continues with following instructions, if any.

10. A system according to claim 7, wherein the frequency distribution checker is operative to examine the program code for opcode constructs, which are expected to occur a known ratio to each other and, if the ratio actually found differs from the known one by more than a certain amount, the file is flagged as possibly viral, or subject to further processing.

11. A system according to claim 7, further comprising an exception list checker operative, when the frequency distribution checker flags the file as possibly viral, to compare the program code with a list of permissible exceptions and to suppress the flag if the program code is considered to be in the exception list.

12. A system according to claim 10, wherein the opcode constructs include subroutine-call and subroutine-return instruction sequences.

\* \* \* \* \*